(No Model.)
A. V. MESEROLE.
SECONDARY BATTERY.
No. 359,877. Patented Mar. 22, 1887.
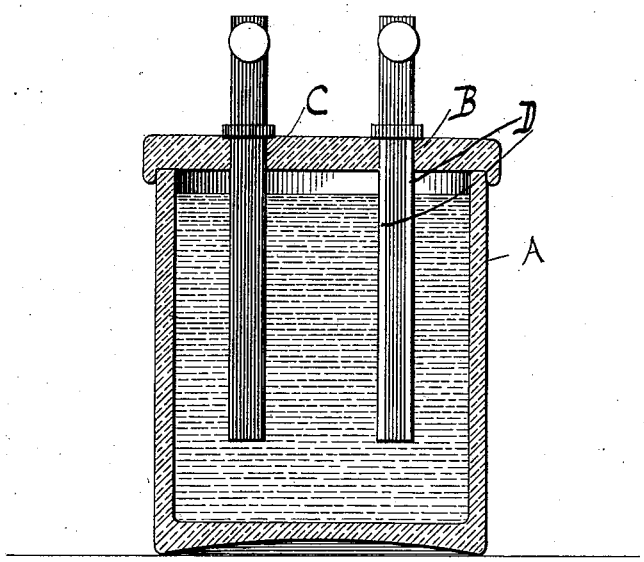
Witnesses
[signature]
Edw. E. Gaffney
Inventor
Abraham V. Meserole
By his Attorneys
Offield Towle & Phelps

UNITED STATES PATENT OFFICE.

ABRAHAM V. MESEROLE, OF NEW YORK, N. Y., ASSIGNOR TO THE RIVER AND RAIL ELECTRIC LIGHT COMPANY, OF WEST VIRGINIA.

SECONDARY BATTERY.

SPECIFICATION forming part of Letters Patent No. 359,877, dated March 22, 1887.

Application filed December 1, 1886. Serial No. 220,393. (No model.)

*To all whom it may concern:*

Be it known that I, ABRAHAM V. MESEROLE, a citizen of the United States, residing at New York, in the county and State of New York, have invented a new and useful Improvement in Secondary Batteries, which I desire to protect by Letters Patent of the United States, and of which the following is a specification, this application being designated by the letter "C."

My invention has relation to that class of batteries which are used for storing up energy for future redevelopment and use, and has for its particular object the production of a battery which shall have a higher electro-motive force than any hitherto known.

I have discovered that an accumulating-battery possessing very remarkable properties may be constructed by immersing plates of zinc and lead in a cell containing a mercury solution, such as sulphate of mercury, a zinc solution, such as sulphate of zinc, and free sulphuric acid, the lead plate being preferably, but not necessarily, amalgamated. If a current be passed through this cell from the lead (negative) to the zinc (positive) plate, a porous and highly absorptive layer of mercury and zinc will be formed on the positive plate, while at the same time the negative plate is oxidized, the cell so prepared yielding in discharge a current of nearly three volts electro-motive force, and maintaining its charge without material diminution for very considerable lengths of time. The action of this battery I conceive to be, in its principal outline, as follows:

During charge zinc and mercury are deposited on the positive plate, hydrogen at the same time being included in that deposit, and peroxide of lead formed on the negative plate. If mercury is present on the negative plate, which is, as I have above stated, thought to be desirable, it will serve to replenish the solution, preventing the bath from being partially or wholly depleted of mercury, and promoting regular action. In discharge the occluded hydrogen, no doubt, to some extent unites with the excess of oxygen on the negative plate, as in the Planté battery; but the current of discharge I believe to be principally due to the following more complex reaction. The deposit of zinc and mercury breaks up and is redissolved, the zinc, by reason of its superior affinity, displacing the mercury in a part of the molecules of mercury sulphate. This displaced mercury in turn displaces hydrogen in the free sulphuric acid, which in turn draws off the oxygen of the peroxidized negative plate. A part of the mercury set free is also, no doubt, thrown upon the negative plate in the form of an oxide. The electro-motive force of the cell should therefore be equal, speaking broadly, to that developed by the zinc replacing the mercury in the mercury sulphate supplemented by that developed by the liberated mercury in replacing hydrogen in the dilute sulphuric acid, and by the displaced hydrogen in uniting with the oxygen of the peroxide.

The well-known Marie Davie primary battery has an electro-motive force of one and a half volts developed by the displacement of mercury in mercury sulphate by zinc; but in this battery the liberated mercury is inactive, being merely deposited on a carbon pole-piece, while in my cell this mercury engages in further reactions, to which the increased electro-motive force is no doubt largely due. I have observed that this electro-motive force is not exhibited until the plates are fully formed and charged—that is, until a substantial deposit of spongy or porous metallic zinc and mercury is formed on the positive plate and of peroxide on the negative plate. The constancy of the secondary current depends upon the substantial character of these deposits, particularly that of the zinc-mercury sponge; and the capacity of the battery to retain its charge, which it possesses in a very remarkable degree when properly formed, depends upon the presence of a considerable quantity of mercury on the positive plate. In this respect the function of the mercury seems to be to prevent the free sulphuric acid of the bath from acting on the zinc of the positive plate.

In the ordinary zinc-lead accumulator the free acid of the solution combines with the zinc and large volumes of hydrogen are given off. This action takes place with the circuit open or closed, and the deposit of zinc being thus rapidly redissolved, the cell soon becomes inactive. In my cell such action is prevented by the mercury present on the positive plate protecting the zinc from attack, except in discharge, and by the capacity of the zinc-mercury sponge to occlude hydrogen.

When my cell is in perfect condition, no hydrogen is given off either in charge or discharge, from which the inference is clear that its liberation is prevented, or that it is fixed or occluded in large quantities, or both in part, of which the last seems to be the most reasonable hypothesis.

A further explanation of the remarkable electro-motive force of this battery may be found in the superior capacity of the electrolytic zinc-mercury sponge to occlude hydrogen and the peculiar qualities of the hydrogen so occluded, due to the conditions under which it is taken up; and, again, the efficiency of the positive plate being for this reason exceptionally great, it is probable that superior efficiency is induced thereby in the negative plate, causing an exceptionally favorable oxidation of the latter plate. I am inclined to believe that in the process of charging, oxygen in the form of ozone is taken up on the negative plate, and that the electro-motive force exhibited may be in part due to this fact.

Having thus given a general view of my improved battery in what I now believe to be its best form, and having indicated in general my theory of its action, I shall now advert to certain subsidiary peculiarities of its action, and suggest certain modifications which may enable the gist of my invention to be seen in a clearer light.

As to the metal used for the negative plate, it is only requisite that it be capable of taking up oxygen to excess. By reason of cheapness and its other suitable qualities I have found lead to be the most available material; but it is evident that any conducting metal capable of taking up and giving off oxygen readily would be in this battery the equivalent of lead.
As above suggested, the function of the positive plate, where zinc is used in the solution, is only to furnish a conducting support for the zinc-mercury deposit. Any metal, therefore, capable of performing this function would be an equivalent of the zinc plate in my cell. I have found that in use a positive plate made up of thin exterior sheets of zinc backed or filled with lead is the most satisfactory.

As I have indicated above, an important part is played in my battery by the spongy porous zinc-mercury deposit; and while I desire to claim and protect herein the described process of producing that deposit, I wish it understood that I also claim its use in an accumulating-battery however it may be obtained; and, also, I claim the described process independently of the particular form or chemical composition of the resulting battery-plate. This deposit is altogether different in character from an amalgamated zinc-plate. The latter has a smooth and polished surface not at all adapted to the occlusion of hydrogen, while the electrolytically-formed surface described is more or less rough, crystalline, and spongy in appearance. There are doubtless a considerable variety of ways in which it may be obtained besides that which has been herein described. Thus sulphides or oxides of mercury and zinc, with or without the addition of finely-divided pure metal, might be pressed into proper form or applied to a proper supporting and conducting structure and reduced to the condition of spongy metal by electrolytic action in a suitable bath, the current in such case being aided by local chemical action.
I have, in fact, found by experiment that this is a fairly effective way to form the battery, though inferior to that first described; and I sometimes also apply mercury and lead oxides or sulphides to the negative plate, which will more readily attain high oxidation than pure metal. So, too, it would perhaps be practicable to make a mechanical mixture of zinc and mercury for the positive plates, grinding up these metals, mixing them in suitable proportions, and pressing them into proper shape, and forming them up electrolytically in the manner suggested for the treatment of sulphides and oxides. So, too, the materials may be placed in porous cups or saucers, the deposit being in this case formed on the top surface of the liquid.

I have selected zinc as a constituent element of my battery for the reason that it gives a highly electro-positive action, and also because the zinc-mercury combination is passive in the solution when no current is flowing; but any other highly electro-positive metal which would maintain its metallic condition in the presence of an acid bath, when associated with mercury, would probably be an equivalent of zinc in this cell.

The relative proportions of mercury and zinc, it need hardly be said, may be widely varied without changing the essential action of the battery, and the same may be said of the relative proportions of the salts and acids composing the electrolyte.

I believe that in actual use sulphides and sulphates of zinc, mercury, and lead are formed on the two battery-plates, as well as the various oxides of those metals, and it is probable that their presence has an effect relative to the high electro-motive force exhibited. I wish it understood, therefore, that I regard the metals in these forms as equivalents in my battery of pure spongy metal.

While, as above stated, any material may be used for the positive plate which will act as a conducting support for the mercury-zinc deposit, still I believe a zinc plate to be preferable, for the reason that a deposit of zinc is more readily made upon a zinc plate than upon a plate of any other material, and enters into closer and more compact union with the plate than it would were the plate of other material. For this reason, as stated, I consider a thin plate of zinc furnished with the requisite strength by backing of lead or other conducting material to be the best form of plate.

With regard to the action of my battery, I should further say that I believe the mercury upon the negative plate to have a value in the battery as an active material, especially when electrolytically deposited, as in my cell, and, further, that its presence on that plate facilitates oxidation and deoxidation of the other active materials of that plate, adding in this way to the electro-motive force of the cell; and, further, that there are probably reactions among the various salts and basic compounds of mercury which are formed in the cell, and between these salts and bases and the other materials contained in the cell, which are too obscure to be followed theoretically. I therefore do not rest my application upon the explanation advanced, although it is the best which I am now able to offer, and I believe it to correspond with the facts. I proceed upon the supposition that my patent will be construed to cover the battery I have invented, whether or not the theory of its action advanced proves to be, in whole or in part, accurate.

In the drawing annexed my invention is conventionally illustrated, A being the cell, B and C the positive and negative pole-pieces, respectively, and D a thin zinc plate forming a part of the positive plate.

In my use of the term "single fluid" as applied to secondary batteries in this application for patent I intend to distinguish between a battery of the sort shown herein and a battery having multiple electrolytic fluids, in which latter class I place all batteries in which the two electrodes are immersed respectively in solutions differing from each other in chemical composition and chemical equivalency, and in which the separation of these solutions from each other is maintained by a porous partition or the like. I intend to include all other secondary batteries under the term "single fluid" secondary batteries.

I reserve the right to file another application for Letters Patent for, and do not hereby dedicate to the public, the following subject-matter: first, in a secondary battery, an electrolytically-deposited active layer of mercury and zinc; second, a secondary battery in which all the active material on one of the pole-pieces is an electrolytical formation of mercury and zinc; and third, the herein-described process of forming electrodes by the electrolytic treatment of sulphides or oxides of zinc and mercury.

By the word "plates" in this application I mean to include all forms of electrodes or pole-pieces.

Having thus described my invention, what I claim, and desire to protect by Letters Patent, is—

1. The improvement in preparing secondary batteries which consists in forming up the positive and negative pole-pieces or plates by immersing them in a single-fluid bath of mercury and zinc solutions and passing an electrical current through them and the liquid.

2. The improvement in preparing secondary batteries which consists in forming up zinc and lead plates therefor by immersing such plates in a single-fluid bath containing a solution of mercury and passing an electrical current through them and the bath.

3. The improvement in preparing secondary batteries which consists in immersing the plates in a single-fluid bath containing mercury and zinc in solution, together with a free acid, and forming up the same for use by passing an electrical current through the plates and the bath.

4. A secondary battery in which both plates are immersed in an electrolyte which contains sulphate of mercury and the positive plate or pole-piece is composed wholly or in part of zinc.

5. A secondary battery in which both plates are immersed in an electrolyte composed of a solution of mercury mixed with a solution of zinc, with or without free acid.

6. A secondary battery in which both plates are immersed in an electrolyte composed of sulphate of mercury and sulphate of zinc, with or without free sulphuric acid.

7. In a secondary battery, a positive pole-piece made up of a thin zinc plate backed by a supporting-plate of lead or other conducting material.

8. A single-fluid secondary battery in which the electrolyte contains a substantial working quantity of mercury in solution and the positive plate is formed in whole or in part of zinc, substantially as set forth.

9. A secondary battery having a single electrolytic fluid in which the active material of the positive element consists of an electrolytically-formed layer of zinc and mercury, substantially as set forth.

10. A single-fluid secondary battery in which the active material of the positive plate is electrolytically-combined zinc and mercury and the active material of the negative plate is oxidized lead, substantially as set forth.

11. A single-fluid secondary battery in which the active material of the positive plate consists of zinc and mercury electrolytically combined and the active material of the negative plate consists of lead and mercury, substantially as set forth.

12. A single-fluid secondary battery in which the active material of the positive plate is mercury electrolytically combined with zinc and the electrolyte whereof contains mercury in solution, substantially as set forth.

13. A single-fluid secondary battery in which the active material of the positive plate consists of mercury electrolytically combined with zinc and the electrolytic fluid whereof contains mercury and zinc in solution, substantially as set forth.

14. A single-fluid secondary battery in which the active material of the positive plate consists of mercury electrolytically combined with zinc, the active material of the negative plate is lead, and the electrolyte whereof contains mercury in solution, substantially as set forth.

15. A single-fluid secondary battery wherein the active material of the positive plate consists of a layer of mercury and zinc electrolytically formed, the active material of the negative plate is lead, and the electrolyte whereof contains zinc and mercury in solution, substantially as set forth.

ABRAHAM V. MESEROLE.

Witnesses:
M. H. PHELPS,
ALBON MAN.